Aug. 6, 1929.  A. O. STROM  1,723,634
REMOVABLE GLASS LIGHT OR LENS FOR SIDE-
WALKS, VAULT COVERS, AND THE LIKE
Original Filed April 20, 1927
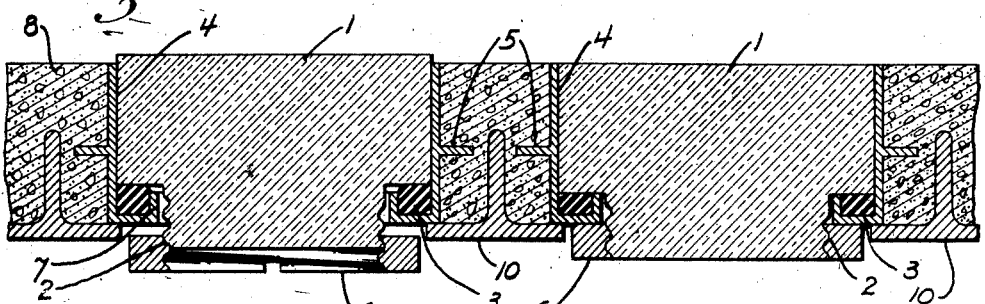
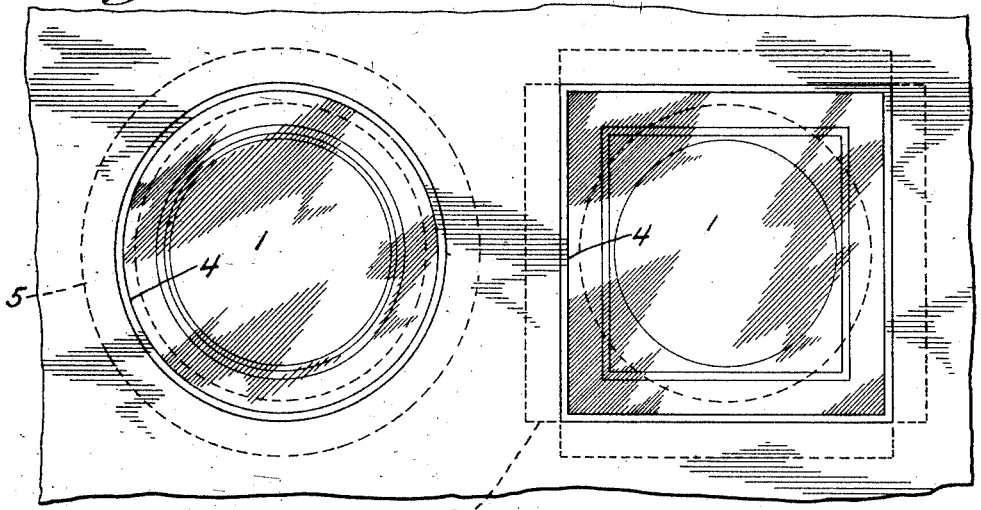
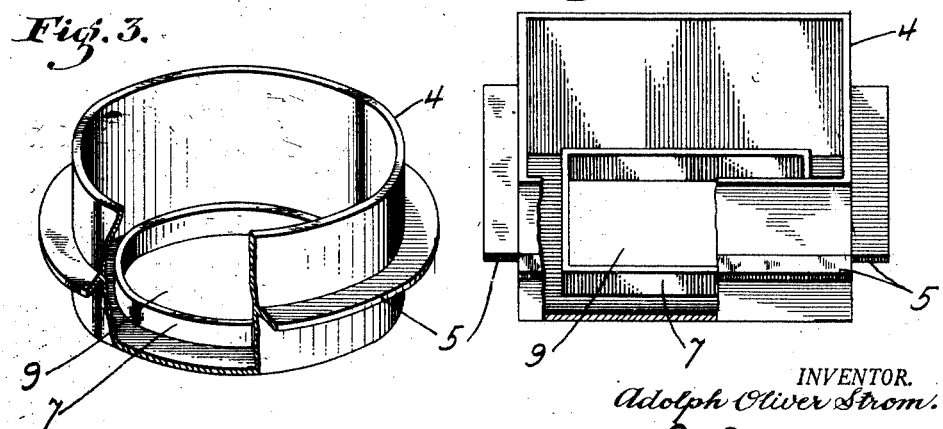
INVENTOR.
Adolph Oliver Strom.
BY
ATTORNEY.

Patented Aug. 6, 1929.

1,723,634

UNITED STATES PATENT OFFICE.

ADOLPH OLIVER STROM, OF ALAMEDA, CALIFORNIA.

REMOVABLE GLASS LIGHT OR LENS FOR SIDEWALKS, VAULT COVERS, AND THE LIKE.

Application filed April 20, 1927, Serial No. 185,321. Renewed April 8, 1929.

This invention relates to vault covers and sidewalk lights.

Hitherto, the most common method of constructing vault covers and sidewalk lights was to provide an open frame formed with sockets to receive transparent lenses. The lenses were secured in position on the frame by filling the interstices between the lenses with cement or other suitable material. The cement secured the lenses in position and also rendered the cover or sidewalk water-proof.

This construction had several disadvantages, the principal one of which was the fact that in the event that a lens was broken it was necessary to chip out the broken lens and the surrounding cementitious material and then insert a new lens and cement it into place. This replacement operation required the labor of a skilled mechanic and also necessitated that the area in which the lens was replaced be barricaded from pedestrians until the cement properly set. It is therefore obvious that such replacements were comparatively costly and at the same time necessitated the maintenance of an undesirable barrier to prevent pedestrians from disturbing the repair.

It is the principal object of the present invention to provide an improved construction for sidewalk and vault lights which overcomes the disadvantages of prior constructions and methods and which enables the lenses to be replaced quickly and inexpensively with the use of unskilled labor and without the use of cementitious material which requires protection until set.

In carrying this invention into practice I provide sockets adapted to be arranged at spaced distances apart on an inexpensive framework. When the sockets are arranged in place the interstices between them are filled with suitable cementitious material to which the sockets and frame are keyed. Lenses are removably fitted to the sockets, each lens having a separate clamping medium for clamping the lens into place and forming a water-tight joint to prevent leakage. As the lenses are removably mounted in the sockets they can be expeditiously removed when broken and quickly replaced without disturbing the sockets or the general assembly.

One form which the invention may assume is exemplified in the following description and illustrated by way of example in the accompanying drawings, in which:

Fig. 1 is a fragmentary view in cross-section through a vault cover constructed in accordance with my present invention.

Fig. 2 is a fragmentary view in plan of the same.

Fig. 3 is a perspective view of a cylindrical type of socket embodying my invention with parts thereof broken away to more clearly disclose its construction.

Fig. 4 is a perspective view of a square type of socket embodying the invention with parts thereof broken away to more clearly disclose its formation.

Referring more particularly to the accompanying drawings, I have illustrated a sidewalk or vault cover with my improved means for receiving lenses. This improved means includes an open framework 10 which in the present instance I have disclosed as constructed of inverted T beams arranged in parallelism at equally spaced distances apart. Arranged between the T beams are lens holders or sockets 4 which are most clearly illustrated in Figs. 3 and 4. The lens holders or sockets 4 are preferably of light metallic construction so that they may be inexpensively produced by die stamping. These holders or sockets 4 can be cylindrical, square or other design at the option of the manufacturer. In Fig. 3 I have shown a socket of cylindrical design while in Fig. 4 I have shown a socket of square outline. In all essentials, however, these two types of sockets are indentical.

It will be noticed that each socket is formed with a channel 7 at its lower end which is contiguous to the inner periphery of the shell of the socket. This channel 7 receives a gasket 3 as illustrated in Fig. 1. A lens 1 is provided for each socket, the upper end of this lens being of the same contour as the socket and of substantially the same dimensions as the socket so that it will snugly nest therein. The lower end of the lens is reduced and cylindrical in form so that it will project through the open bottom of the socket 4.

The cylindrical lower end of the lens 1 is threaded as at 2 and receives a nut 6. This nut 6 is of a dimension so that it will engage the bottom of the socket when threaded onto the threaded lower end of the lens to clamp the lens in place in the socket. It will be noticed from Fig. 1 that by drawing up on the nut 6 that the gasket 3 will be compressed to an extent forming a watertight joint between the socket and the lens and bringing the upper surface of the lens flush with the top edge of the socket.

In practicing the invention, the frame 10 is laid and the sockets 4 are positioned with their lower ends bearing on the adjacent flanges of the T beams which comprise the frame. Cementitious material is then filled in the interstices between the sockets and finished flush with the top edges of the sockets. The sockets 4 are fitted with flanges 5 or other keying means to form a key between the cement and the sockets. The frame 10 is also keyed to the cement by means of the body portion of the T beams of the frame.

When the cement has set, the sockets and the frame 10 will be united into a rigid structure. The gaskets 3 are then applied to the sockets and the lenses are then fitted into place. When the nuts 6 are drawn up, the lenses 1 will be drawn into place compressing the gaskets 3 and forming a watertight joint between the lenses and the sockets. The lenses will also be drawn to such a position that their upper surfaces will be flush with the upper edges of the sockets and the cement filling.

Should a lens be broken, it is only necessary to remove the nut 6 and withdraw the broken lens. A new lens may then be inserted and the nut 6 applied and drawn up to position the lens properly in place.

This is a very simple operation and does not require the use of skilled labor. Also the sockets and cementitious material need not be disturbed when making a replacement which eliminates the necessity of erecting a barrier about a repaired area on the side walk or vault cover.

From the foregoing it is obvious that I have provided a very efficient and inexpensive structure for vault covers and sidewalks which enables the lenses to be readily replaced when broken.

While I have shown the preferred form of my invention, it is to be understood that various changes may be made in its construction by those skilled in the art without departing from the spirit of the invention as defined in the appended claims.

I claim:—

1. In a side-walk structure of the class described, a set of T beams placed parallel to each other and imbedded in concrete, lens holders supported directly by the flanges of said T beams, each of said holders having a flange on the exterior imbedded in the said concrete and a flange in the interior at the bottom, an upturned lip at the bottom flange forming a pocket for a packing and producing a water-proof joint between the walls of the lens and lens holder, said lens having a narrowed threaded neck at the bottom, and a nut adapted to engage said neck for firmly holding said lens in place.

2. In a structure of the character described, an open frame, a plurality of separate lens holders supported by the frame, the spaces between the frame and the holders being filled with cementitious material, the cementitious material being finished flush with the upper edges of the holders, keying means on the exterior of each holder embedded in the cementitious material, a channel formed at the bottom of each holder contiguous to the inner periphery thereof, packing means in said channel, a lens for each holder, said lens having a portion snugly fitting the socket above the packing means and abutting on the packing means, the lower end of said lens having a narrowed threaded neck, and a nut adapted to threadedly engage said neck and abut against the bottom of the holder for firmly holding said lens in place.

3. In a structure of the character described, an open frame, a plurality of separate lens holders arranged on the frame and supported thereby, the spaces between the holders and the frame being filled with cementitious material, keying means on the exterior of each holder embedded in the cementitious material, said cementitious material being finished flush with the top edges of the holders, each holder having a flange in the interior thereof at the lower end thereof, an upturned lip at the inner periphery of said interior flange forming an annullar pocket, a gasket arranged in said pocket and projecting slightly above said lip, a lens for each holder, each lens comprising an upper portion snugly fitting within the holder and bearing on the gasket, a lower portion reduced in cross-section and projecting through the holder, said lower portion being threaded, and a nut threaded on said lower portion and abutting against the bottom of the holder to draw the lens downwardly and compress the gasket forming a watertight joint between the lens and lens holder and positioning the upper face of the lens flush with the upper edge of the holder.

4. A lens and holder for the purpose described, said holder comprising a shell, keying means at the exterior of the shell adapted to be embedded in cementitious material, the lower end of the shell being inturned and then upturned to form an annular channel, a gasket in said channel, said gasket when expanded adapted to project slightly above said upturned edge, a lens having an upper portion adapted to snugly fit within the shell above the gasket and to bear on the gasket, said lens having a lower portion of reduced diameter projecting through the holder, said reduced portion being threaded, a nut threaded on the reduced portion and adapted to abut against the bottom of the holder to draw the lens down into the shell and compress the gasket to form a waterproof joint between the lens and holder, the depth of the upper portion of the lens being such that it will lie flush with the upper edge of the shell when the nut is drawn up to clamp the lens in position.

ADOLPH OLIVER STROM.